(12) United States Patent
Fossum et al.

(10) Patent No.: US 7,830,438 B2
(45) Date of Patent: Nov. 9, 2010

(54) FRAME SHUTTERING SCHEME FOR INCREASED FRAME RATE

(75) Inventors: Eric R. Fossum, La Crescenta, CA (US); Sandor L. Barna, Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 420 days.

(21) Appl. No.: 11/490,523

(22) Filed: Jul. 21, 2006

(65) Prior Publication Data

US 2007/0030371 A1 Feb. 8, 2007

Related U.S. Application Data

(63) Continuation of application No. 09/792,292, filed on Feb. 22, 2001, now Pat. No. 7,092,021.

(60) Provisional application No. 60/184,202, filed on Feb. 22, 2000.

(51) Int. Cl.
*H04N 3/14* (2006.01)
*H04N 5/335* (2006.01)

(52) U.S. Cl. .................. 348/305; 348/296; 348/308; 348/322

(58) Field of Classification Search ............... 348/305, 348/296, 308, 322, 208.6, 208.3, 216.1, 217.1, 348/218.1, 309, 307, 317, 316, 320, 321, 348/323, 324, 312, 335, 220.1
See application file for complete search history.

(56) References Cited

U.S. PATENT DOCUMENTS

| | | | |
|---|---|---|---|
| 3,814,846 A | 6/1974 | Snow | |
| 4,322,752 A | 3/1982 | Bixby | |
| 4,330,796 A | 5/1982 | Anagnostopoulos et al. | |
| 4,339,775 A | 7/1982 | Lemke et al. | |
| 4,539,596 A * | 9/1985 | Elabd | 348/316 |
| 4,745,482 A * | 5/1988 | Baumeister | 386/108 |
| 4,785,353 A | 11/1988 | Seim | |
| 5,182,648 A * | 1/1993 | Hirota | 348/311 |
| 5,251,019 A * | 10/1993 | Moorman et al. | 348/275 |
| 5,321,509 A | 6/1994 | Kannegundla | |
| 5,396,091 A | 3/1995 | Kobayashi et al. | |
| 5,402,173 A * | 3/1995 | Noguchi et al. | 348/322 |
| 5,412,422 A * | 5/1995 | Yamada et al. | 348/218.1 |
| 5,436,662 A | 7/1995 | Nagasaki et al. | |
| 5,463,421 A | 10/1995 | Deguchi et al. | |
| 5,500,675 A | 3/1996 | Arakawa et al. | |
| 5,754,229 A | 5/1998 | Elabd | |
| 5,764,289 A | 6/1998 | Fukui | |
| 5,955,753 A | 9/1999 | Takahashi | |
| 5,966,174 A | 10/1999 | Yamamoto et al. | |
| 5,973,311 A | 10/1999 | Sauer et al. | |
| 6,002,432 A | 12/1999 | Merrill et al. | |

(Continued)

FOREIGN PATENT DOCUMENTS

EP          720387 A2 *   7/1996

*Primary Examiner*—John M Villecco

(57) ABSTRACT

A frame shutter apparatus comprising a controller for controlling multiple groups of pixels and for reading out values corresponding to the charge collected by different groups of pixels at different times. A method of reading out multiple groups of pixels is provided wherein values corresponding to the charge collected by one group of pixels is readout at a different time than the values corresponding to the charge collected by another group of pixels.

9 Claims, 2 Drawing Sheets

U.S. PATENT DOCUMENTS

| | | | |
|---|---|---|---|
| 6,008,486 A | 12/1999 | Stam et al. | |
| 6,054,703 A * | 4/2000 | Liu | 250/208.1 |
| 6,084,229 A | 7/2000 | Pace et al. | |
| 6,118,481 A | 9/2000 | Hamada | |
| 6,122,008 A | 9/2000 | Komobuchi et al. | |
| 6,141,049 A | 10/2000 | Harada | |
| 6,172,352 B1 * | 1/2001 | Liu | 250/208.1 |
| 6,181,375 B1 * | 1/2001 | Mitsui et al. | 348/240.99 |
| 6,211,915 B1 | 4/2001 | Harada | |
| 6,249,618 B1 | 6/2001 | Hou | |
| 6,320,618 B1 | 11/2001 | Aoyama | |
| 6,335,757 B1 | 1/2002 | Vodanovic | |
| 6,365,886 B1 | 4/2002 | Ang et al. | |
| 6,429,898 B1 | 8/2002 | Shoda et al. | |
| 6,441,849 B1 * | 8/2002 | Fukuda | 348/230.1 |
| 6,452,634 B1 | 9/2002 | Ishigami et al. | |
| 6,529,242 B1 | 3/2003 | Panicacci | |
| 6,546,147 B1 * | 4/2003 | Apel et al. | 382/260 |
| 6,590,198 B1 | 7/2003 | Zarnowski et al. | |
| 6,614,472 B1 | 9/2003 | Yamashita | |
| 6,687,026 B1 | 2/2004 | Steinebach | |
| 6,847,399 B1 * | 1/2005 | Ang | 348/308 |

\* cited by examiner

FRAME SHUTTERING SCHEME FOR INCREASED FRAME RATE

CROSS REFERENCE TO RELATED APPLICATIONS

This application is a continuation of U.S. application Ser. No. 09/792,292, filed Feb. 22, 2001, now U.S. Pat. No. 7,092, 021 which claims the benefit of the U.S. Provisional Application No. 60/184,202, filed on Feb. 22, 2000, the subject matter of each is incorporated by reference in its entirety herein.

BACKGROUND

Active pixel sensors, such as described in U.S. Pat. No. 5,471,215, enable acquisition of images at relatively higher rates. Different pixel circuits have been designed which enable acquiring images at even higher rates. This can enable obtaining image information after a short time of integration, and hence allow very fast snapshots to be taken with such a sensor. The integration times for such a sensor may be considerably shorter than the time it takes to read out a frame, called the "frame readout time". Fast-moving images, therefore, are effectively frozen in time.

A limit on the speed of such a system may be set by the time it takes to read out the entire active pixel array, which may include more than one million pixels. This read out time is typically at least 100 times the length of the frame integration time.

SUMMARY

The inventors have found that the relatively long read out time may prevent capturing multiple images at short time separations. The present application teaches a technique of dividing certain kinds of resolution of the image into multiple different read out images, in order to obtain faster image read out.

BRIEF DESCRIPTION OF THE DRAWINGS

These and other aspects of the invention will be described in detail with reference to the accompanying drawings, wherein.

DETAILED DESCRIPTION

Figure 1:
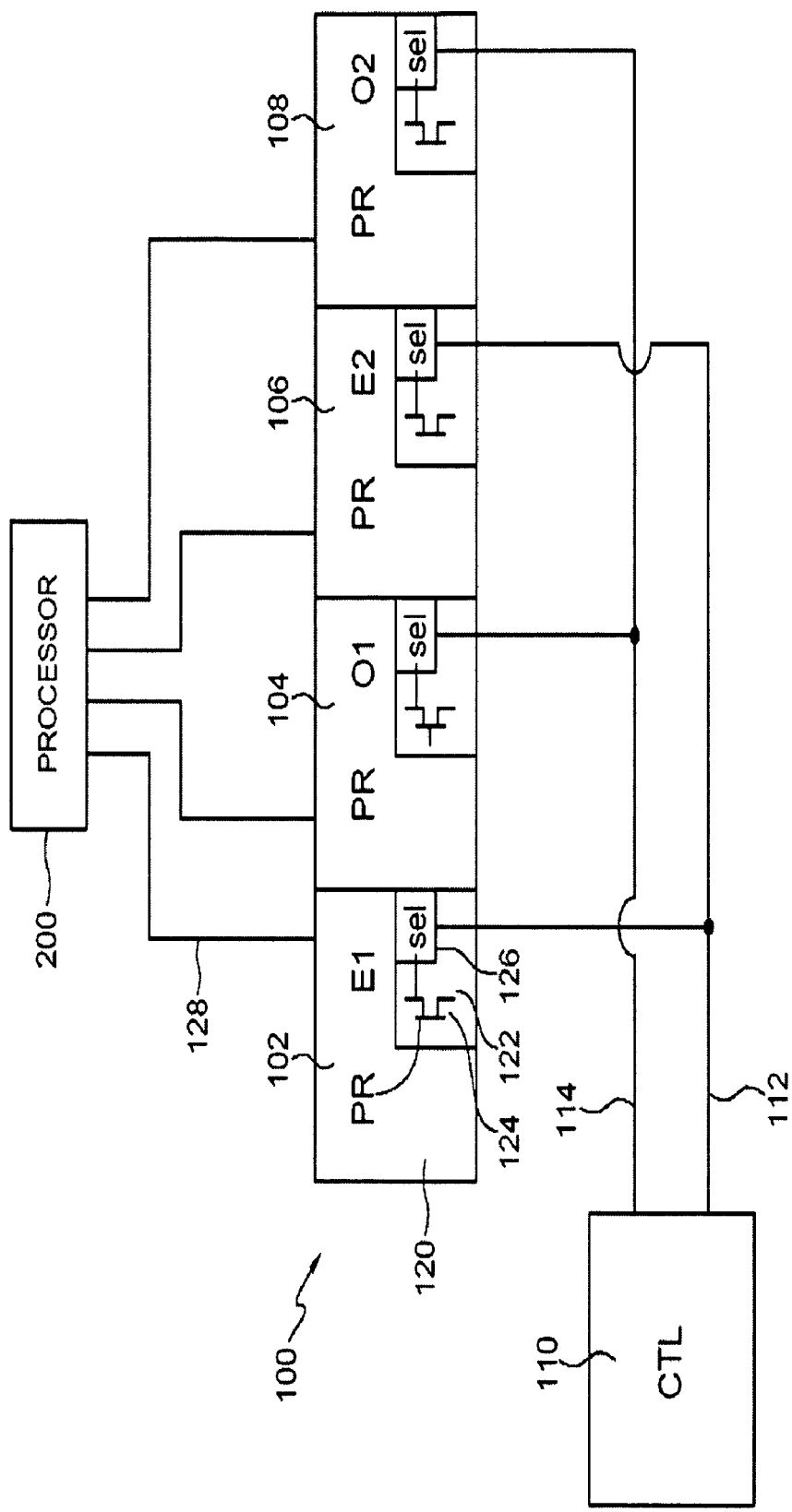
FIG. 1 shows a block diagram of a first embodiment which uses a divide by two scheme.

FIG. 1 shows an embodiment of the present system. A simplified active pixel array 100 is shown in FIG. 1. While the array shown in FIG. 1 has only four pixels, it should be understood that the actual array may have many more pixels, upwards of one million pixels. In the present embodiment, a resolution of an output image is divided by two in order to speed up the read out.

The active pixel sensor includes a plurality of pixels such as 104. Each pixel includes a photoreceptor 120, e.g., a photodiode or a photogate, and a control part 122. The control part may include an in pixel follower circuit 124, and a pixel selector circuit 126. The selector circuit is actuated in order to couple charge from the pixel 102 to an output line shown as 128.

A standard frame shutter operates by controlling each of a plurality of timing lines for each row of the active pixel sensor simultaneously. The integration time for each row becomes identical.

The present system operates in a different way. The pixels are divided into groups. In the embodiment of FIG. 1, there are two groups, which include even pixels and odd pixels. FIG. 1 shows the even pixels 102,106, and the odd pixels 104,108.

A controller 110 controls the integration and read out. The row drivers within the controller 110 operate to allow one set of timing for the even grouped pixels 102,106. As shown, the readout line 112 controls all of the even grouped pixels at the same time.

A separate timing, controlled by readout line 114, is used for the odd grouped pixels.

After each integration time, the results are read out using the standard CMOS active pixel sensor row-wise operation. The read out image includes two interleaved images. Each interleaved image has half of the vertical resolution of the sensor, but occurs at a much faster readout time.

The two interleaved images are coupled to an image processor 200, which can be a processor that separates the two images using software to separate the even-based image from the odd-based image.

An alternative provides a modified readout control in the controller 110. In this modified system, first the even group is read out, then the odd group. This directly produces the two interleaved images, and eliminates any need for later reconstruction of the two images.

The FIG. 1 embodiment describes dividing the resolution and hence time to read by two. More generally, it is preferred that each two adjacent pixels integrate at a different time. An alternative embodiment shown in FIG. 2 allows dividing by n. Each of n groups of the active pixel array is sampled at a specific time. The active pixels 202, 204, 206 and 208 correspond to pixel 1-pixel n. This provides separate timing control lines. A first timing control line 210 is for pixel 0, and pixel n, pixel 2n, and so on. The next timing control signal 212 goes to row 1, row n+1 plus one . . . The last timing control lines 214 controls row n−1, 2n−1 . . . The readout image has a vertical resolution which is reduced by the factor of n.

In this embodiment, the readout can occur in the order of the images, that is in the order 0, n, 2n . . . for the first image, then 1, n+1, 2n+1 . . . in order to allow the multiple images to be read out sequentially. When read out in this way, the first resolution divided image will be obtained first, followed by the second resolution divided image.

Figure 2:
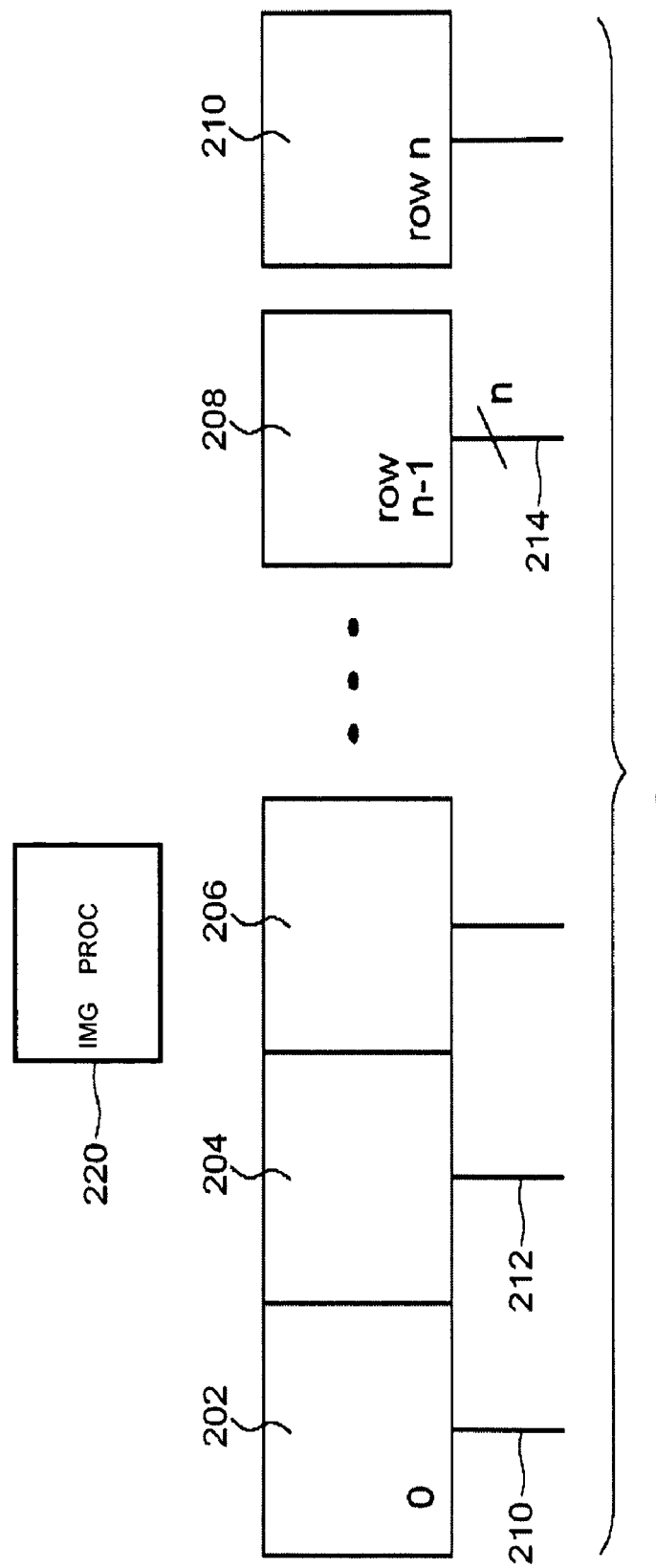
FIG. 2 shows a block diagram of the second embodiment which uses a divide by n scheme.

Alternatively, the FIG. 2 embodiment can read out all images in pixel order in the usual way, and use an image processor 220 to separate the n images.

Although only a few embodiments have been disclosed in detail above, other modifications are possible. All such modifications are intended to be encompassed within the following claims.

Other embodiments are within the disclosed invention.

What is claimed is:

1. An imager comprising:
    a pixel array comprising a plurality of pixels arranged in rows and columns, each pixel comprising a photosensor and selection circuitry for reading out a pixel signal from the pixel; and
    a circuit for operating said pixel array to control integration and read out of pixel signals from the pixels in said pixel array, said circuit being configured to:
    operate a first group of pixels in the array causing them to integrate an image signal for a first integration time;

operate a second group of pixels in the array causing them to integrate an image signal for a second integration time, the first and second groups of pixels each comprising pixels in a plurality of interleaving columns of the pixel array; and read out signals from said first and second groups of pixels as first and second interleaved images, wherein the step of reading out the first and second interleaved images comprises outputting the images as a single image and using a processor to separate the first interleaved image from the second.

2. The imager of claim 1, wherein:

the first group of pixels is located in even numbered columns of the array; and the second group of pixels is located in odd numbered columns of the array.

3. The imager of claim 1, further comprising separate timing control lines for each pixel group.

4. An imaging system comprising:

an array of pixels; and a controller configured to:

operate a first group of pixels in the array via a first set of readout lines using a first integration time to generate a first interleaved image;

operate a second group of pixels in the array via a second, different, set of readout lines using a second integration time to generate a second interleaved image, the first and second groups of pixels being interleaved; and read out the first and second interleaved images from the pixel array by reading out the rows of the images as a single image and using a processor to separate the first interleaved image from the second.

5. The imaging system of claim 4, wherein:

the first group of pixels is located in even numbered columns of the array; and the second group of pixels is located in odd numbered columns of the array.

6. The imaging system of claim 4, wherein the array of pixels is arranged in rows and columns and each pixel comprises a photosensor and selection circuitry for reading out a pixel signal from the pixel.

7. A method of operating a pixel array comprising:

operating a first group of pixels of said array via a first set of readout lines for a first integration time to generate a first interleaved image;

operating a second group of pixels of said array via a second, different, set of readout lines for a second integration time to generate a second interleaved image, the first and second groups of pixels each comprising pixels in a plurality of interleaving columns of the pixel array; and outputting the first and second interleaved images by activation of selection circuitry in each of the pixels in the first and second groups, wherein the step of outputting the first and second interleaved images comprises outputting the images as a single image and using a processor to separate the first interleaved image from the second.

8. The method of claim 7, wherein:

the first group of columns are even columns of the pixel array; and the second group of columns are odd columns of the pixel array.

9. The method of claim 7, wherein:

the outputting further comprises outputting pixel values from a row of the second interleaved image before and after outputting a pixel value from a row of the second interleaved image.

\* \* \* \* \*